(12) United States Patent
Wuebbolt-Gorbatenko et al.

(10) Patent No.: US 11,458,789 B2
(45) Date of Patent: Oct. 4, 2022

(54) FORK LEG FOR ROTATING A WHEEL OF A MOTOR VEHICLE

(71) Applicant: Schaeffler Technologies AG & Co. KG, Herzogenaurach (DE)

(72) Inventors: Benjamin Wuebbolt-Gorbatenko, Erlangen (DE); Simon Mersmann, Herzogenaurach (DE); Christian Harkort, Erlangen (DE); Andreas Wöllner, Nuremberg (DE); Axel Hoffmann, Neustadt/Weinstraße (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/259,315

(22) PCT Filed: Apr. 4, 2019

(86) PCT No.: PCT/DE2019/100307
§ 371 (c)(1),
(2) Date: Jan. 11, 2021

(87) PCT Pub. No.: WO2020/015771
PCT Pub. Date: Jan. 23, 2020

(65) Prior Publication Data
US 2021/0252928 A1    Aug. 19, 2021

(30) Foreign Application Priority Data

Jul. 18, 2018   (DE) .................... 10 2018 117 376.8

(51) Int. Cl.
*B60G 3/20*     (2006.01)
*B60G 3/14*     (2006.01)

(52) U.S. Cl.
CPC ................ *B60G 3/20* (2013.01); *B60G 3/14* (2013.01); *B60G 2200/44* (2013.01); *B60G 2300/37* (2013.01)

(58) Field of Classification Search
CPC ... B60G 3/02; B60G 3/20; B60G 3/14; B60G 2200/44; B60G 2300/37; B62D 7/06
See application file for complete search history.

(56) References Cited

U.S. PATENT DOCUMENTS 2,435,814 A * 2/1948 Allison .................... B62D 7/18
                                                    180/254
4,974,872 A * 12/1990 Riese ....................... B60T 1/06
                                                    280/124.147
(Continued)

FOREIGN PATENT DOCUMENTS

CN        206679065 U     11/2017
DE     102015212575 A1     1/2017
(Continued)

*Primary Examiner* — Frank B Vanaman
*Assistant Examiner* — Tiffany L Webb

(57) ABSTRACT

A fork leg for rotating a wheel of a motor vehicle is provided with a fastening flange for the coaxial, torque-proof fastening of a steering rod, an extension region protruding from the fastening flange substantially perpendicularly to the steering axis for bridging a lateral distance to the wheel, a coupling point for the articulated connection of a rocker which is connected to the wheel and a connection piece which is connected integrally to the extension region and to the coupling point, wherein the connection piece is shaped to accommodate a large steering angle.

14 Claims, 5 Drawing Sheets

(56) References Cited

U.S. PATENT DOCUMENTS

| | | | | |
|---|---|---|---|---|
| 5,018,757 A | * | 5/1991 | Kozuka | B62D 17/00 |
| | | | | 280/5.523 |
| 9,296,274 B2 | * | 3/2016 | Gano | B60B 33/006 |
| 11,104,197 B2 | * | 8/2021 | Stapelbroek Trennepohl | |
| | | | | A01B 63/00 |

FOREIGN PATENT DOCUMENTS

| | | |
|---|---|---|
| DE | 102015212580 A1 | 1/2017 |
| WO | 2011098848 A1 | 8/2011 |
| WO | 2016091641 A1 | 6/2016 |

* cited by examiner

FORK LEG FOR ROTATING A WHEEL OF A MOTOR VEHICLE

CROSS-REFERENCE TO RELATED APPLICATIONS

This application is the U.S. National Phase of PCT Appln. No. PCT/DE2019/100307 filed Apr. 4, 2019, which claims priority to DE 10 2018 117 376.8 filed Jul. 18, 2018, the entire disclosures of which are incorporated by reference herein.

TECHNICAL FIELD

The disclosure relates to a fork leg for rotating a wheel of a motor vehicle, with the aid of which a sprung wheel of a wheel module can be rotated within a wheelhouse of the motor vehicle for a steering movement of the motor vehicle.

BACKGROUND

A motor vehicle with a wheel module is known from CN 206679065 U, in which a wheel of the wheel module can be rotated by 90° about a vertical steering axis to be able to park the motor vehicle, even in narrow parking spaces.

SUMMARY

There is an ongoing need to be able to steer a wheel over the largest possible steering angle.

It is desirable to identify measures which make a wheel module with a large steering angle for a motor vehicle possible.

A fork leg for rotating a wheel of a motor vehicle is provided with a fastening flange for the coaxial, torque-proof fastening of a steering rod, which is rotatable about a steering axis, an extension region protruding from the fastening flange substantially perpendicularly to the steering axis for bridging a lateral distance to the wheel, a coupling point for the articulated connection of a rocker, which is connected to the wheel and a connection piece, which is connected integrally to the extension region and to the coupling point, wherein the connection piece has a bridging region running downwards substantially parallel to the steering axis from the extension region in the direction of gravity and a transmission region which is connected to the bridging region and to the coupling point, wherein a receiving angle or engaging around a wheel face of a wheelhouse of the motor vehicle is formed in a maximally deflected extreme position of the wheel between the bridging region and/or the extension region on the one hand and the transmission region on the other hand.

The fastening flange of the fork leg is generally positioned above the wheel in a common vertical plane with the wheel, so that the steering axis of the steering rod can run through the wheel. With the help of the extension region of the fork leg, the rest of the fork leg can be offset laterally to the wheel so that the connection piece of the fork leg, a rocker articulated on the wheel and on the coupling point of the connection piece, and a shock absorber can be positioned laterally next to the wheel without striking the wheel during a steering movement of the wheel. When viewed in the axial direction of the wheel, the wheel can cover the rocker and/or at least a large part of the transmission region of the connection piece. However, the wheelhouse of the motor vehicle is stationary and does not move with the wheel. In the case of a rod-like, substantially straight configuration of the connection piece of the fork leg, the connection piece, which runs obliquely from the extension region to the coupling point, would strike a wheel face delimiting the wheelhouse downwards and towards the outside of the motor vehicle. In contrast to a rod-like configuration of the connection piece, the connection piece of the fork leg according to the invention initially runs downward in the bridging region before it runs in the transmission region with a portion in the radial direction of the wheel. The extent of the connection piece with a portion in the radial direction of the wheel can thus begin at a height level at which the transmission region of the connection piece is already arranged laterally next to the wheel and/or is positioned below the wheel face. In the maximally deflected extreme position of the wheel, the transmission region of the connection piece can protrude from the wheelhouse past the wheel face, wherein a particularly large steering angle for the wheel is achieved without concern that the fork leg will strike the wheel face. In the extreme position of the wheel, the fork leg can, for example, run in an L-shaped, Z-shaped and/or U-shaped manner past the wheel face. For this purpose, the receiving angle formed between the bridging region and/or the extension region on the one hand and the transmission region on the other hand can form a depression in the fork leg, which is delimited, for example, by two angular sides arranged at approximately 90° to one another and into which the wheel face in the extreme position of the wheel can dip. The shape of the receiving angle can in particular be adapted to the shape of the wheel face when the wheel is turned to the extreme position. This makes use of the fact that there is sufficient installation space on the side next to the wheel to achieve a right-angled course past the wheel face by means of a suitable, accommodating design of the connection piece and nevertheless to be able to adequately support the forces that occur. Due to the angular course of the connection piece realized with the aid of the receiving angle, the fork leg can engage around the wheel face of the wheelhouse even with a very large steering angle of the wheel without striking same, so that a wheel module for a motor vehicle with a large steering angle is made possible.

In particular, the receiving angle is substantially arc-shaped for engaging around the arc-shaped wheel face in an angular range. The lower limit of the wheelhouse given by the wheel face can thereby have a semicircular course lying in a vertical plane, which can be engaged around by the receiving angle of the connection piece in a limited angular range. A rectangular shape of the wheelhouse, which is generally perceived as unattractive, can be avoided in this way. The shape of the fork leg can thus be well integrated into the stylistic elements of the motor vehicle in the vicinity.

The connection piece, in particular the bridging region, preferably has a greater extent transverse to the longitudinal extent thereof than the extension region. This makes it possible to support forces along the fork leg, even with a substantially rectangular configuration of the receiving angle, without a tension seating that is too large. In addition, notch effects can be avoided or at least reduced and/or compensated for.

The connection piece, in particular the transmission region, is particularly preferably designed as a hollow chamber profile. As a result, the connection piece can be of lightweight construction and, despite occupying a larger installation space, can have a low weight. Due to the low material use achieved with the hollow chamber profile, the connection piece can be inexpensively manufactured with good strength and stability.

A wheel module for a motor vehicle, in particular a multi-track passenger car, has a wheel for moving the motor vehicle, a wheelhouse for receiving the wheel, wherein the wheelhouse has a wheel face for limiting the wheelhouse downwards and outwards from the motor vehicle, a steering rod rotatably mountable on a support frame of the motor vehicle for transmitting a steering movement to the wheel, a fork leg connected to the steering rod, which can be designed and developed as described above, a rocker articulated to the coupling point of the fork leg and to the wheel and a rocker having an articulated connection with the steering rod of the fork leg the wheel and a shock absorber connected to the fork leg for vibration damping of a relative movement of the wheel, wherein the transmission region of the fork leg partially protrudes laterally from the wheelhouse in the maximally deflected extreme position of the wheel. Due to the angular course of the connection piece realized with the aid of the receiving angle, the fork leg can engage around the wheel face of the wheelhouse even with a very large steering angle of the wheel without striking same, so that a wheel module for a motor vehicle with a large steering angle is made possible.

Preferably, an in particular substantially radial distance of the transmission region to the wheel face in the maximally deflected extreme position of the wheel in the region of the receiving angle is substantially the same size over an angular range. The outer contour of the transmission region in the receiving angle can be adapted to the inner contour of the wheel face in a limited angular range of the wheel face, so that a high steering angle for the wheel can be realized with a high stability of the connection piece in the transmission region.

Particularly preferably, an in particular substantially horizontal distance of the bridging region to the wheel face in the maximally deflected extreme position of the wheel in the region of the receiving angle is substantially the same size over an angular range. The outward-pointing contour of the bridging region in the receiving angle can be adapted to the lateral contour of the wheel face in a limited angular range of the wheel face, so that a high steering angle for the wheel can be realized with a high stability of the connection piece in the bridging region.

In particular, the wheel face is designed to be substantially semicircular. The wheel face can thus correspond to the course of a simple geometric shape, which simplifies the manufacture of the wheel face and in particular the geometric adaptation of the receiving angle to the shape of the wheel face.

The wheel is preferably rotatable by a total steering angle $\delta$ where $120° \leq \delta \leq 360°$, in particular $135° \leq \delta \leq 200°$, preferably $150° \leq \delta \leq 180°$, and particularly preferably $165° \leq \delta \leq 175°$. Due to the angular course of the fork leg, a particularly large steering angle can be realized which even enables a direction of travel of the motor vehicle that is substantially transverse to the longitudinal extent of the motor vehicle. This makes it easier to park the motor vehicle in tight parking spaces and enables a particularly small turning circle.

The wheel is particularly preferably rotatable in at least one maximally deflected extreme position to a starting position intended for forward driving by a steering angle $\Delta\delta$ wherein $85° \leq \Delta\delta \leq 100°$ and in particular $90° \leq \Delta\delta \leq 95°$. Due to the angular course of the fork leg, a particularly large steering angle can be realized, which, at least in the extreme position in which the receiving angle engages around the wheel face, even enables a direction of travel of the motor vehicle which is substantially transverse to the longitudinal extent of the motor vehicle. This makes it easier to park the motor vehicle in tight parking spaces and enables a particularly small turning circle. Even with a steering angle $\Delta\delta$ exceeding 90°, a slight reverse drive is possible despite the forward gear being engaged and/or a slight forward drive is possible despite the reverse gear being engaged, which further simplifies parking in narrow parking spaces without having to switch between the forward gear and the reverse gear.

BRIEF DESCRIPTION OF THE DRAWINGS

In the following, the wheel module is explained by way of example with reference to the attached drawings using preferred exemplary embodiments. In the figures.

DETAILED DESCRIPTION

Figure 1:
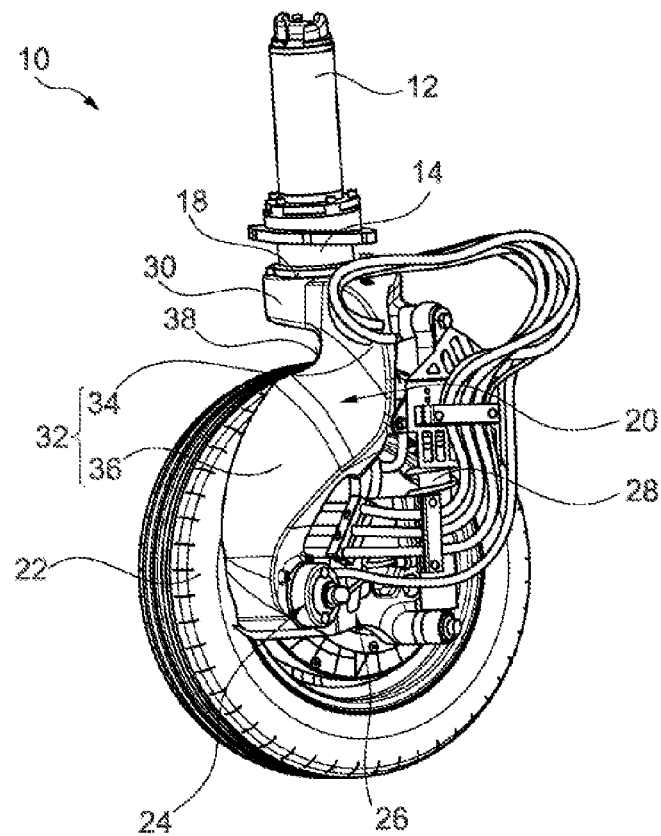
FIG. 1: shows a schematic perspective view of a wheel module.

The wheel module 10 shown in FIG. 1 for a motor vehicle designed as a multi-track passenger car has a steering rod 14 which can be rotated by a steering actuator 12. The steering rod 14 can be directly or indirectly rotatably mounted via a steering head bearing on a support frame of the motor vehicle, wherein the steering rod 14 is in particular immovably mounted in the axial direction of the steering rod 14, for example by an axial bearing. A fork leg 20 is attached in a torque-proof manner to the steering rod 14 via a fastening flange 18 and forms a coupling point 24 on the horizontal level of an axis of rotation of a wheel 22 to be steered of the wheel module 10. A rocker 26 is connected in a pivoted manner at the coupling point 24, wherein the rocker 26 is connected at the other end thereof to the wheel 22 in an articulated and coaxial manner. A shock absorber 28 is attached to the wheel 22 and/or to the rocker 26, which is attached at the other end thereof to the steering rod 14 and/or to the fork leg 20. A level control device can be provided between the shock absorber 28 and the steering rod 14. The wheel 22 can in particular be driven and/or decelerated by a wheel hub drive.

Figure 2:
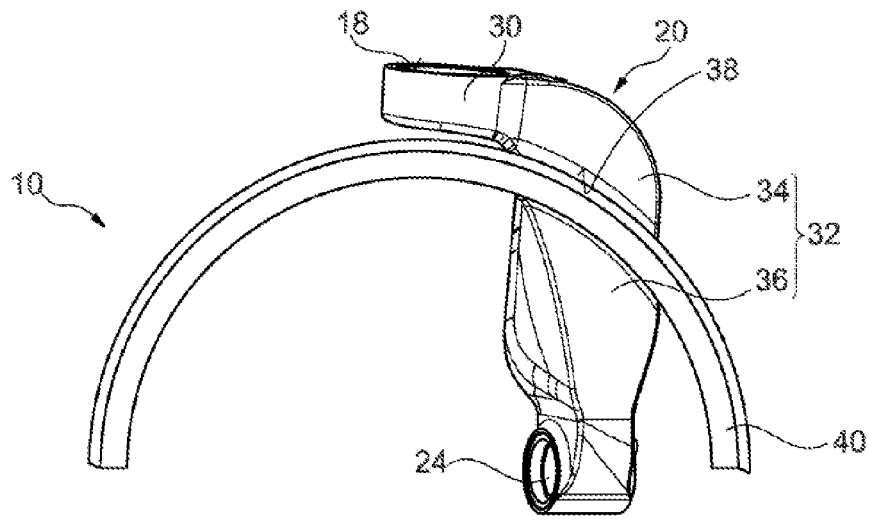
FIG. 2: shows a schematic side view from the outside of a wheel module according to FIG. 1, shown in reduced form.
Figure 3:
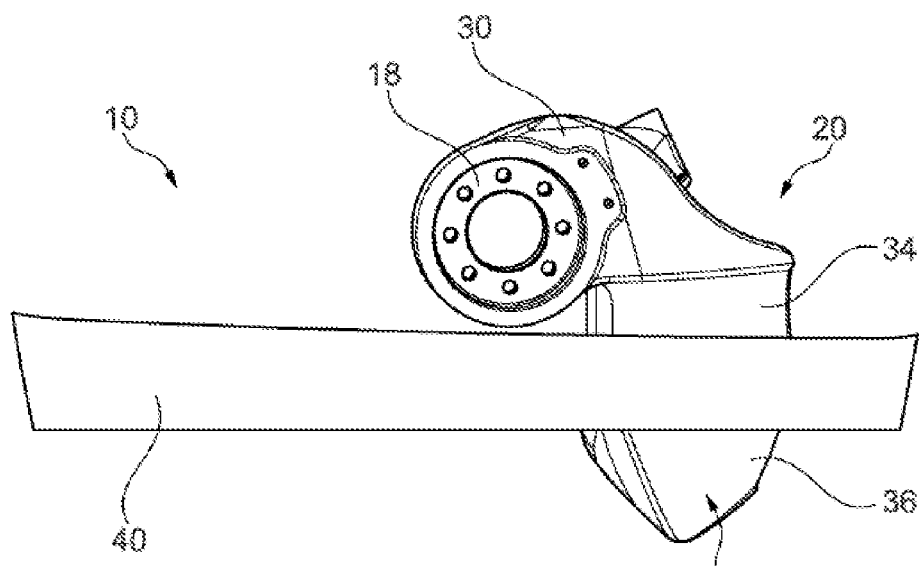
FIG. 3: shows a schematic plan view of the wheel module from FIG. 2, FIG. 4: shows a schematic front view of the wheel module from FIG. 2, FIG. 5: shows a schematic perspective view of a fork leg of the wheel module from FIG. 1, FIG. 6: shows a schematic perspective view of a fork leg of the wheel module of FIG. 5, and FIG. 7: shows a schematic side view from the outside of a fork leg from FIG. 5.
Figure 4:
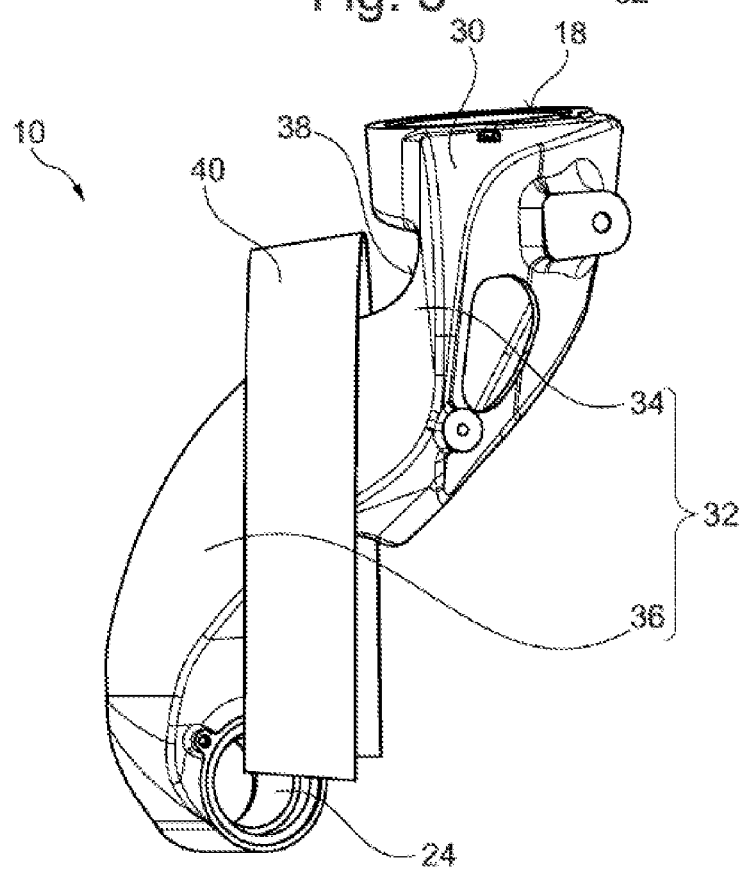

The fork leg 20 has an extension region 30 which protrudes substantially horizontally from the fastening flange 18 and from which a connection piece 32 extends to the coupling point 24. The connection piece 32 has a bridging region 34 running downward predominantly in the vertical direction from the extension region 30 and from which a transmission region 36 protrudes, which extends in the vertical direction and in the radial direction of the wheel 22. A substantially L-shaped receiving angle 38 is formed on the upper side between the bridging region 34 and the transmission region 36, which, in particular together with the extension region 34, can have a substantially U-shaped section. In an extreme position of the wheel 22 rotated by approximately 90° for forward travel, the receiving angle 38 can engage around a wheel face 40 which delimits the lower edge of a wheelhouse, so that the wheel face 40 can engage in a receiving space delimited by the receiving angle 38 without striking the fork leg, as shown in FIG. 2. The receiving angle 38 can follow the curved course of the wheel face 40, so that a substantially constant distance is provided in the extreme position between the transmission region 36 and the wheel face, as shown in FIG. 2, and between the bridging region 34 and the wheel face, as shown in FIGS. 3 and 4.

Figure 5:
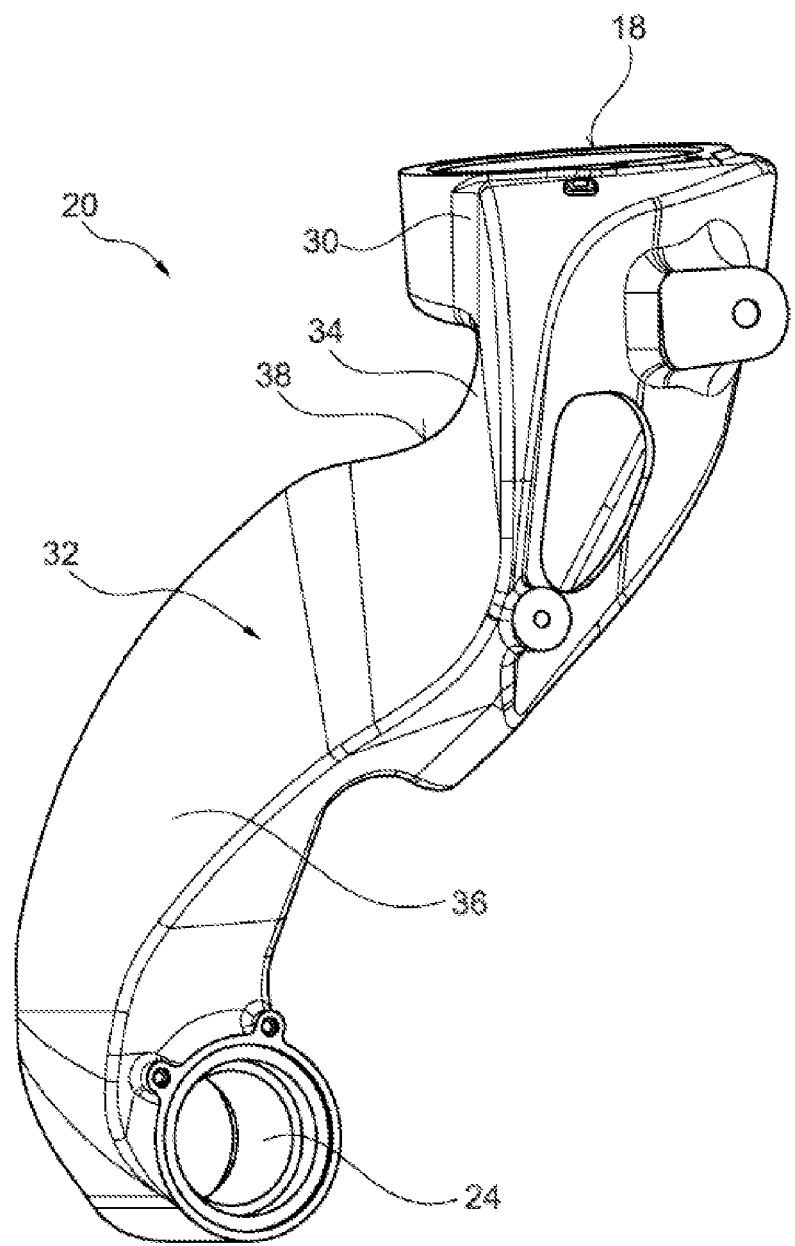
Figure 6:
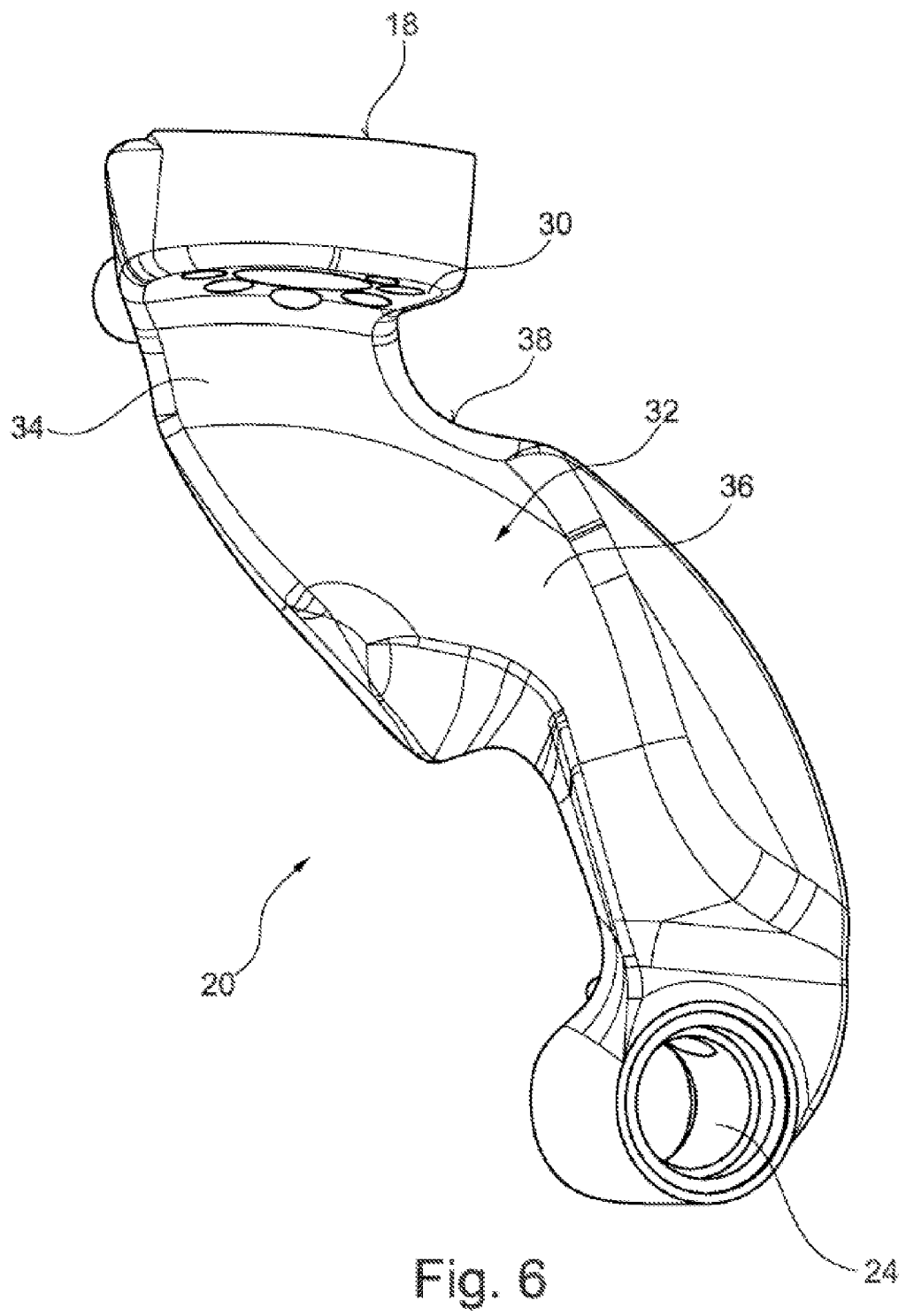
Figure 7:
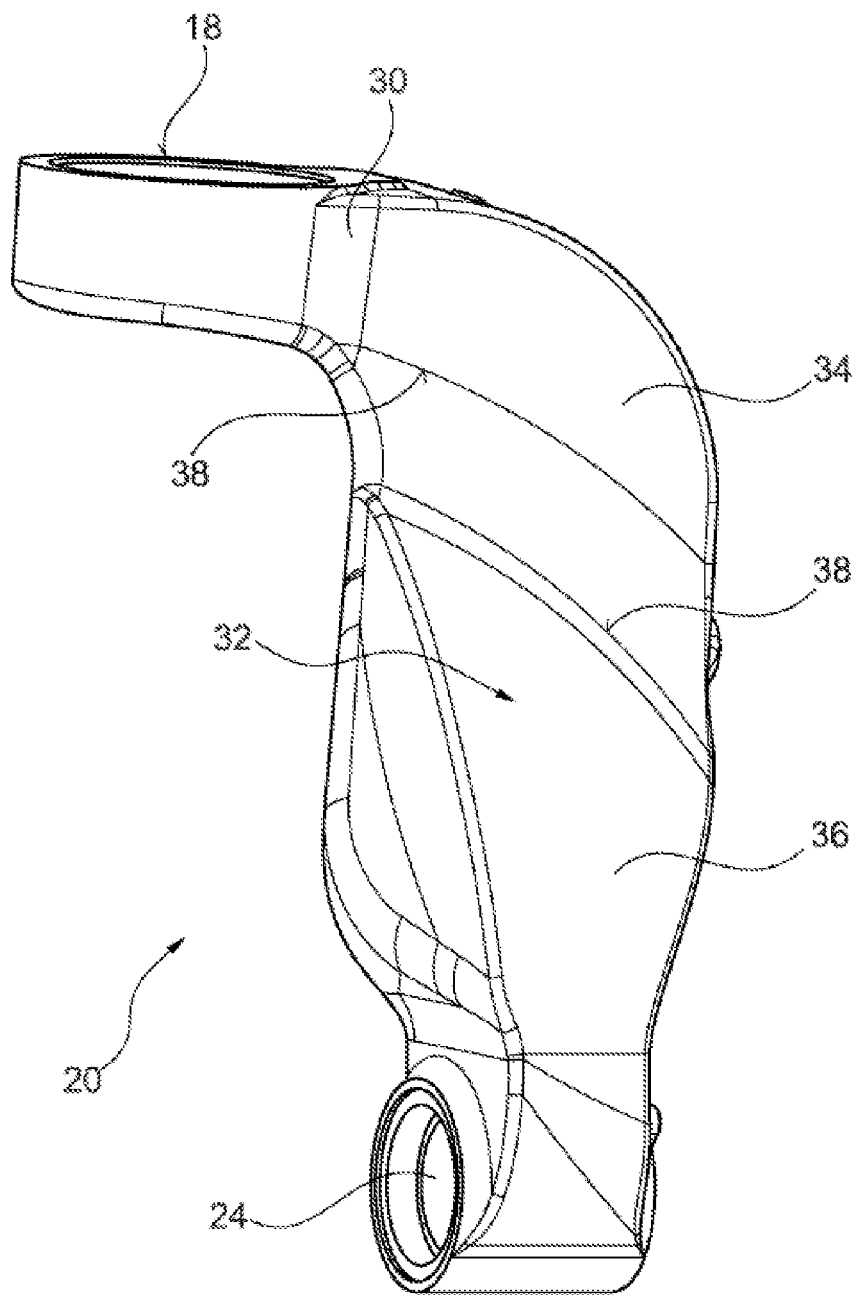

As shown in FIGS. 5 and 6, the receiving angle 38 can have sides that run substantially at right angles, in the uppermost region in particular in the vertical direction and in the horizontal direction, which are connected to one another via a rounded transition in the manner of a radius. A sharp-edged corner with notch effects can thus be avoided. In addition, the receiving angle 38 on the surface of the connection piece 32 can be rounded to follow the semicircular course of the wheel face 40, as shown in FIG. 7.

LIST OF REFERENCE SYMBOLS

10 Wheel module
12 Steering actuator
14 Steering rod
18 Fastening flange
20 Fork leg
22 Wheel
24 Coupling point
26 Rocker
28 Shock absorber
30 Extension region
32 Connection piece
34 Bridging region
36 Transmission region
38 Receiving angle
40 Wheel face

The invention claimed is:

1. A fork leg for rotating a wheel of a motor vehicle, the fork leg comprising:
a fastening flange for a coaxial, torque-proof fastening of a steering rod which is rotatable about a steering axis,
an extension region protruding from the fastening flange substantially perpendicular to the steering axis, the extension region configured for bridging a lateral distance to the wheel,
a coupling point for an articulated connection of a rocker configured to be connected to the wheel, and
a connection piece which is connected integrally to the extension region and to the coupling point,
the connection piece having;
a bridging region running downwards substantially parallel to the steering axis from the extension region, and
a transmission region configured to be connected to the bridging region and to the coupling point, and
a receiving angle defining a receiving angle arc configured for extending around a wheel face of a wheelhouse of the motor vehicle in a maximally deflected extreme position of the wheel, the receiving angle formed between the bridging region and the transmission region, and the receiving angle arc is configured to correspond with an arc of the wheel face.

2. The fork leg according to claim 1, wherein the receiving angle arc extends downward toward the coupling point and a first end of the receiving angle are closet to the extension region is taller than a second end of the receiving angle arc closet to the coupling point.

3. A wheel module for a motor vehicle, the wheel module comprising:
a wheel for moving the motor vehicle,
the fork leg of claim 1,
a shock absorber connected to the rocker and the fork leg for damping vibrations of a relative movement of the wheel,
wherein the transmission region of the fork leg partially protrudes laterally from the wheelhouse in the maximally deflected extreme position of the wheel.

4. The wheel module according to claim 3, wherein a radial distance of the transmission region to the wheel face in the maximally deflected extreme position of the wheel in a region of the receiving angle is substantially a same size over an angular range.

5. The wheel module according to claim 3, wherein a horizontal distance of the bridging region to the wheel face in the maximally deflected extreme position of the wheel in a region of the receiving angle is substantially a same size over an angular range.

6. The wheel module according to claim 3, wherein the wheel face is semicircular.

7. The wheel module according to claim 3, wherein the steering rod is rotatable by a total steering angle $\delta$ where $120° \leq \delta \leq 360°$.

8. The wheel module according to claim 7, wherein $135° \leq \delta \leq 200°$.

9. The wheel module according to claim 7, wherein $150° \leq \delta \leq 180°$.

10. The wheel module according to claim 7, wherein $165° \leq \delta \leq 175°$.

11. The wheel module according to claim 3, wherein the wheel in at least one maximally deflected extreme position to a starting position provided for forward driving can be rotated by a steering angle $\Delta\delta$ where $85° \leq \Delta\delta \leq 100°$.

12. The wheel module according to claim 11, wherein $90° \leq \Delta\delta \leq 95°$.

13. A fork leg for rotating a wheel of a motor vehicle, the fork leg comprising:
a fastening flange configured for fastening of a steering rod which is rotatable about a steering axis,
an extension region protruding from the fastening flange substantially perpendicular to the steering axis, the extension region configured for bridging a lateral distance to the wheel,
a coupling point for an articulated connection of a rocker configured to be connected to the wheel, and
a connection piece which is connected integrally to the extension region and to the coupling point, the connection piece having:
a bridging region running downwards substantially parallel to the steering axis from the extension region, and
a transmission region configured to be connected to the bridging region and to the coupling point, and
a receiving angle defining a curved depression configured for extending around a wheel face of a wheelhouse of the motor vehicle in a maximally deflected extreme position of the wheel, the receiving angle formed between the bridging region and the transmission region, and the curved depression configured to correspond with an arc-shape of the wheel face.

14. The fork leg of claim 13, wherein the curved depression extends downward toward the coupling point and a first end of the curved depression closest to the extension region is taller than a second end of the curved depression closest to the coupling point.

* * * * *